United States Patent [19]
Jones et al.

[11] Patent Number: 4,881,252
[45] Date of Patent: Nov. 14, 1989

[54] SHELTERED HOUSING SCHEME COMMUNICATIONS SYSTEM

[75] Inventors: David Jones, North Humberside; David I. Abbott, West Yorkshire, both of England

[73] Assignee: Tunstall Telecom Limited, Yorkshire, England

[21] Appl. No.: 207,124

[22] Filed: Jun. 15, 1988

[30] Foreign Application Priority Data

Jun. 16, 1987 [GB] United Kingdom ............... 8714003

[51] Int. Cl.$^4$ .................... H04M 11/04; H04M 1/64
[52] U.S. Cl. ................................. 379/38; 379/40; 379/45; 379/49; 340/533
[58] Field of Search ............... 379/37, 39, 40, 42–44, 379/47–49, 51, 38, 45, 159, 160, 172, 173; 340/533, 531, 539

[56] References Cited

U.S. PATENT DOCUMENTS

| | | | |
|---|---|---|---|
| 3,909,551 | 9/1975 | Marshall | 379/159 |
| 3,990,075 | 11/1976 | Schmitz et al. | 379/40 |
| 4,097,690 | 6/1978 | Kuntz et al. | 379/39 |
| 4,554,411 | 11/1985 | Armstrong | 379/160 |
| 4,689,811 | 8/1987 | Lennstrom et al. | 379/46 |

FOREIGN PATENT DOCUMENTS

0039203 11/1981 European Pat. Off. ............ 340/533

Primary Examiner—Jin F. Ng
Assistant Examiner—Wing F. Chan
Attorney, Agent, or Firm—Darby & Darby

[57] ABSTRACT

A sheltered housing scheme communications system is provided. The system includes a master unit carried by a warden which is able to receive and initiate outside telephone calls. This is accomplished by inserting the master unit into a system cable which controls an auto dialer. The auto dialer is capable of dialing a non-pre-programmed telephone number by operation of the master unit. The master unit also functions to indicate its availability to answer an incoming call to the central control unit.

10 Claims, 3 Drawing Sheets

SHELTERED HOUSING SCHEME COMMUNICATIONS SYSTEM

This invention relates to a speech emergency call system.

Emergency call systems for elderly or infirm people have become widespread, particularly in sheltered housing schemes. Such systems permit an emergency call, from equipment in a resident's dwelling, to be transmitted to the office of a warden or guardian by way of a private telecommunication network.

Some sheltered housing schemes include separate bungalow-type dwellings for each resident, or pair of residents, and other schemes include multi-storey blocks in which each resident, or resident pair occupies their own flat in the block. One type of emergency call system that is in use in sheltered housing schemes comprises a speech module (commonly in the form of a wall-mounted alarm panel) in each separate dwelling, all the speech modules being connected in parallel by a cable network or system cable to a central control unit, which comprises a cabinet containing control electronics. A warden supervising the sheltered housing scheme is provided with a pocket-size master unit which may be plugged into the system cable by way of a socket provided on each speech module for this purpose. The warden's office is also provided with a speech module, and the master unit can similarly be plugged into that module when the warden is in the office.

When an emergency call is initiated from any dwelling, the central control unit will cause a tone to be sounded by the master unit if this is plugged into a speech module. Each speech module has a numerical identity code which is transmitted to the central control unit when a call is raised by the resident initiating a call on that module. The number of the calling speech module is transmitted from the control unit to the master unit, which emits a calling tone and displays the number of the calling speech module. If more than one call is being handled by the system at any one time, then the numbers of the calling speech modules may be displayed in sequence on the master unit.

On hearing the tone from the master unit the warden notes the identity code of the calling speech module and answers the call by entering codes and pressing dedicated function keys on a key pad of the master unit. The warden may then hold a two-way conversation with the calling resident by way of loudspeaking equipment in the calling speech module and in the speech module into which the master unit is plugged. Half-duplex speech communication is usually used, with the speech direction and call clearing being controlled from the master unit by the warden at all times.

In addition to answering calls from residents, the warden may initiate a call to a (non-calling) selected resident by entering the identity code of the respective speech module on the plugged-in master unit. The central control unit routes the call to the selected speech module, and the warden may then control a two-way conversation with the resident answering the called speech module.

It is now common for a group call system to be equipped with apparatus whereby emergency calls may be transmitted from the system via the public telephone network to a central emergency control centre, for example, serving all of the group call systems of a particular Local Authority. Such central handling of calls may be referred to as "off-site" supervision, as distinct from supervision by an "on-site" warden. A given system may have the facility to be switched between on-site and off-site supervision, the switching being that of the whole system.

The invention seeks to provide improvements for speech emergency call systems, with the objective of improving the versatility of such systems.

According to a first aspect of the invention a speech emergency call system comprises a central control unit; a system cable connected to the central control unit; a plurality of speech modules each capable of handling two-way speech communication, all the speech modules being connected in parallel to the central control unit by the system cable; each speech module having an associated call initiator and means for transmitting a unique identity code from that speech module to the central control unit when a call is initiated from that speech module; a plurality of master units each having a unique distinguishing code, each master unit comprising means whereby it is connectable to the system cable, alerting means capable of response to a call initiated from a speech module and two-way speech communication control means; the control unit including recognition means for recognising the identity code of any calling speech module, and routing means for initially routing all calls from a first group of speech modules as recognised by said recognition means to a first one of said master units, and for initially routing all calls from a second group of speech modules as recognised by said recognition means to a second one of said master units.

This makes possible the grouping or zoning of speech modules, so that all modules in a given zone will have their calls initially routed to a given master unit. The number of speech modules in a given zone, and the number of zones and hence master units are a matter of choice for the particular system and are limited principally by the capacity of the central control unit. Control units are available that are capable of handling calls from several hundred speech modules, and the system thus facilitates multi-warden care in large sheltered housing complexes. Eah warden, with his own master unit, will thus have control of, for example, a group of individual buildings, or of all flats on a given floor or floors of a multi-storey block.

It will be understood that there may be periods during which a warden is unavailable to deal with calls from his particular group or zone, and it is therefore preferred that the routing means includes means for re-routing calls from speech modules in the group of a first given master unit to be received by a second given master unit. This may be effected by a default signal from the given master unit, which default signal may be a re-routing control signal transmitted from said given master unit. Thus, on suitable disabling operation of that master unit, calls will automatically be re-routed by the control unit to a different master unit. The warden controlling that other master unit can thus respond to calls from the unmanned zone. As an alternative, the default signal may be generated automatically if calls remain unanswered on said given master unit for a specified duration. In a further alternative, a re-routing control signal may be transmitted to the central control unit from the master unit to which the calls are to be transferred.

According to a second aspect of the invention we provide a speech emergency call system comprising a central control unit; a system cable connected to the central control unit; a plurality of speech modules each capable of handling two-way speech communication, all the speech modules being connected in parallel to the central control unit by the system cable; each speech module having an associated call initiator and means for transmitting a unique identity code from that speech module to the central control unit when a call is initiated from that speech module; a master unit comprising means whereby it is connectable to the system cable, alerting means capable of response to a call initiated from a speech module and two-way speech communication control means; an interface unit connected between the central control unit and a line of the public telephone network, the interface unit including autodialling means for automatically dialling a telephone number; the master unit and the central control unit including emergency call means operative to cause an outgoing call to be autodialled over the public telephone network and for the master unit to be placed in two-way speech communication once the outgoing call has been connected.

The autodialling means may operate to dial a preprogrammed telephone number, or may operate to dial a telephone number entered by appropriate operation of the master unit. Both facilities may be available if required.

Preferably the central control unit includes means responsive to an incoming call from the public telephone network, and for signalling to the master unit that such incoming call is present.

The master unit may simply be equipped with means for indicating, visually and/or audibly, the presence of an incoming call on the public telephone network. The warden may then proceed to his office to accept the call on a telephone unit located therein. Preferably, however, the central control unit includes means for routing the incoming call to the master unit, and the master unit has means enabling it to receive the incoming call. The warden will then have the choice of ansewring the call by use of the master unit or by going to his office.

Desirably, a plurality of master units are provided, and each master unit has the capability of causing an outgoing call to be autodialled over the public telephone network.

Preferably, each master unit has a unique distinguishing code, and the central control unit is operative to route an incoming call to any selected master unit.

According to a third aspect of the invention, particularly suitable when a plurality of master units are provided, a speech emergency call system comprises a central control unit; a system cable connected to the central control unit; a plurality of speech modules each capable of handling two-way speech communication, all the speech modules being connected in parallel to the central control unit by the system cable; each speech module having an associated call initiator and means for transmitting a unique identity code from that speech module to the central control unit when a call is initiated from that speech module; a plurality of master units, each having a unique distinguishing code, each master unit comprising means whereby it is connectable to the system cable, alerting means capable of response to a call initiated from a speech module and two-way speech communication control means; the control unit including recognition means for recognising the identity code of any calling speech module, and routing means for initially routing all calls from a first group of speech modules as recognised by said recognition means to a first one of said master units, and for initially routing all calls from a second group of speech modules as recognised by said recognition means to a second one of said master units; an interface unit connected between the central control unit and a line of the public telephone network, the interface unit including autodial means for automatically dialling a telephone number; each master unit and the central control unit including emergency call means operative to cause an outgoing call to be autodialled over the public telephone network and for the master unit to be placed in two-way speech communication once the outgoing call has been connected; and the central control unit including means responsive to an incoming call from the public telephone network and for routing that call to any selected master unit, each master unit having means enabling it to receive an incoming call.

Clearly, there are many detailed ways in which the invention can be implemented. Preferably, however, each component of a system, i.e. the central control unit, each speech module, each master unit and the means enabling communication over the public telephone network incorporates and is controlled by its own microprocessor, which both generates control signals for other components of the system and receives control signals from other components of the system, these signals being carried by the system cable.

The invention will now be described in more detail, by way of example only, with reference to the accompanying drawings, in which.

Figure 1:
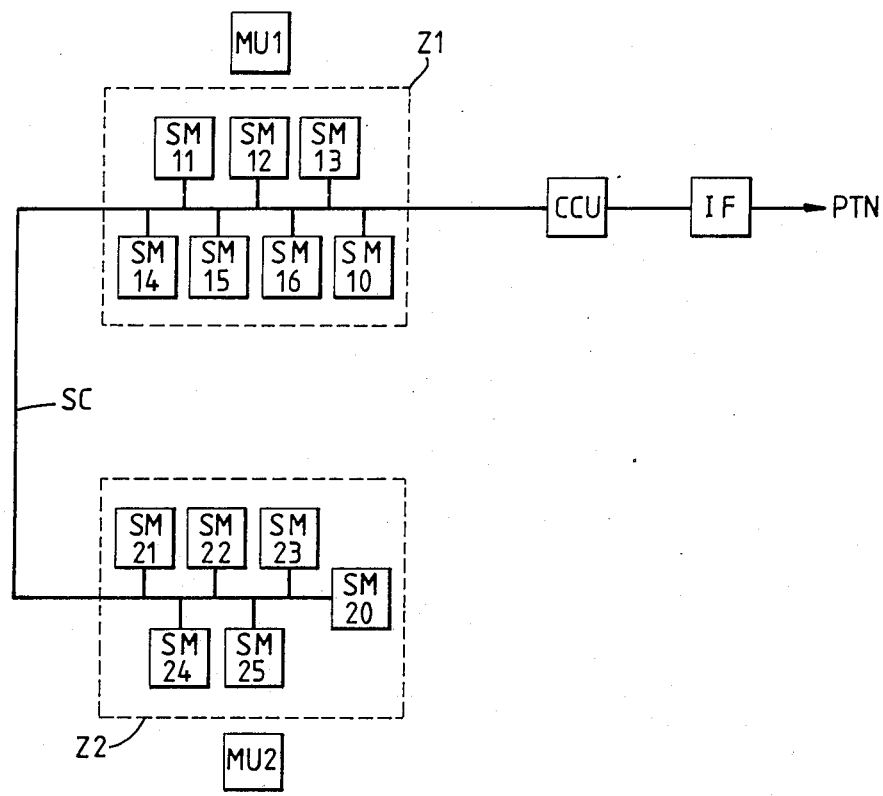
FIG. 1 is a block diagram of an embodiment of emergency speech communication system according to the invention.

Referring now to FIG. 1, there is shown diagramatically a central control unit CCU, to which is connected a system cable SC, typically a ten-core cable capable of carrying the necessary power, data signals, control signals and audio signals. A plurality of speech modules SM are all connected in parallel to the system cable. Each speech module is located in an individual dwelling of a sheltered housing scheme, and the speech modules, and thus the dwellings, are grouped into different zones Z1, Z2 for emergency call purposes. The zones will typically comprise a group of adjacent buildings or all flats on a given floor of a multi-storey block. Each zone is under the care of a warden who carries with him a master unit MU1, MU2 respectively for that zone. Each warden has a base or office, at which is installed a speech module similar to the speech modules SM. In the example shown, zone Z1, normally controlled from master unit MU1, has a warden's base speech module SM10, and residents' speech modules SM11 to SM16. Zone 2, normally controlled from master unit MU2, has a warden's base speech module SM20, and residents' speech modules SM21 to SM25.

It will be understood that there may be as many speech modules in a given zone as required, and that there may be as many zones as required, each with its associates master unit.

Figure 2:
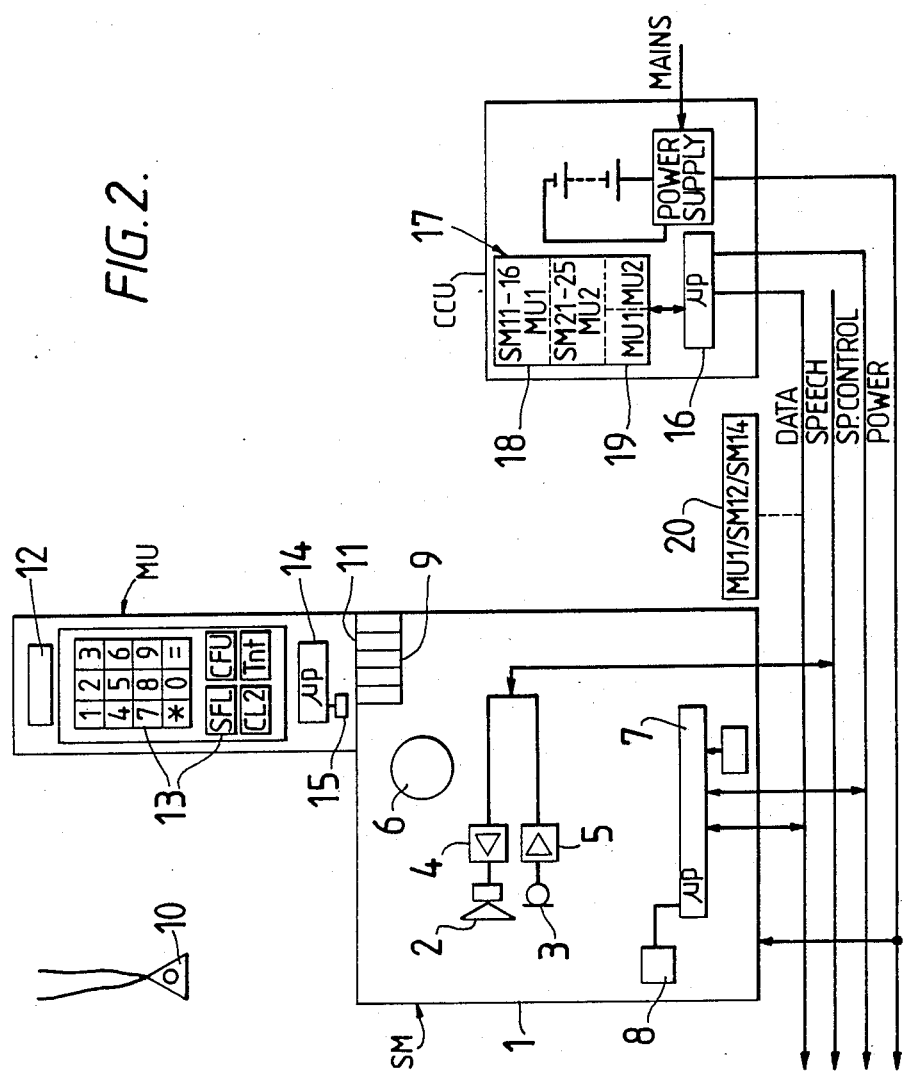
FIG. 2 is a schematic illustration of the central control unit and of one speech module and one master unit forming part of the system.

Each speech module SM is typically a small wall-mounted alarm panel 1, as shown in FIG. 2, incorporating a loudspeaker 2 and microphone 3 with associated amplification and switching circuitry 4, 5, a momentary action call-raising switch e.g. a push button 6 on the panel, and a microprocessor 7 for controlling operation of the speech module. This microprocessor carries in memory 8 an identity code unique within the system to that speech module. In addition, the speech module incorporates an electrical connector 9 into which a master unit MU may be plugged. Each speech module may also incorporate a radio receiver which, in association with a small portable transmitter 10 carried by the protected resident, provides as its main function a means of raising an emergency call without the person having first to reach the speech module. The wardens' speech modules SM10 and SM20 may differ from the other speech modules, as the push button 6 and radio receiver are unnecessary.

The master unit MU has an electrical connector 11 by which it may be plugged into any selected speech module. The master unit incorporates a display element 12, typically a liquid crystal display, a keypad 13 with numeric keys and keys dedicated to specific call handling functions, and a microprocessor 14 for controlling operation of the master unit. The microprocessor carries in memory 15 a distinguishing code unique within the system to that master unit.

The central control unit CCU also includes a microprocessor 16 having a memory unit 17 and a mains power supply with standby battery facility. The memory unit 17 has a section 18 in which are stored the identity codes of the speech modules, together with, for each identity code, the distinguishing code of the master unit for the zone in which that speech module is included. The memory unit 17 has a further section 19 for storing, at any given time, the distinguishing code of each master unit and, grouped with that code, the identity of all calling speech modules included in the zone of that master unit. The microprocessor 16 includes routing means in the form of programme commands for reading the memory section 19 at predetermined intervals and for transmitting on the system cable a data packet comprising the distinguishing code of a given master unit followed by the identity codes of all calling speech modules in the zone of that master unit.

Operation of the system is as follows. To raise an emergency call, a resident either presses push button 6 or, if unable to reach the speech module, presses the button on the portable transmitter 10, the signal from which is received and decoded in the speech module. The effect of either of these actions is to place a signal on an output line to the speech module, causing the module to transmit the identity code of that module in the form of a digital signal on the system cable SC to the central control unit CCU. The transmitted identity code is checked against the list of speech module identity numbers carried in memory section 18, and is transferred into memory section 19, grouped with the distinguishing code of the master unit for the appropriate zone.

The memory section 18 is scanned under control of the microprocessor 16 at fixed intervals e.g. every three seconds, and its contents i.e. one or more speech module identity codes, are transmitted on the system cable SC in the form of data packets, each prefixed with a master unit address. All data packets arising from signals from speech modules SM11 to SM16 in zone 1 carry the address of the master unit MU1 for that zone, and all arising from signals from speech modules SM21 to SM25 in zone 2 carry the address of the master unit MU2 for that zone. An exemplary data packet 20 is illustrated in FIG. 2, showing calls from speech modules SM12 and SM 14 destined for receipt by master unit MU1. Each master unit is controlled by its own microprocessor so that it can only receive the signals addressed to it, and the identity codes of calling speech modules in the zone of that master unit are displayed in cyclic sequence in the LCD display 12 of the master unit. Receipt of data from the control unit also causes the master unit to emit a tone, drawing the arrival of a call to the attention of the warden or guardian.

The warden may then initiate speech contact with any selected calling resident by pressing a select key on the keypad 13 whilst the identity code of that resident's speech module is displayed. The effect of this is to enable speech communication between the calling speech module and the master unit, that communication being in half-duplex form under control of the warden by way of the master unit.

In the zoned call system disclosed herein, in which a warden is assigned to a specific zone, there may be occasions on which a warden is unavailable to deal with incoming and outgoing calls from his zone and his master unit will not be plugged into the system. The system is therefore provided with means for re-routing calls, in such event, to one of the other master units. Each master unit may, therefore, have a divert facility which, when operated, programmes the control unit to change the address for calls from speech modules in another zone to the address of the master unit to which calls will be transferred. This can be effected by entering a divert code through the keypad 13, together with the distinguishing code of the master unit receiving the diverted calls. The divert code will be recognised by the microprocessor 16 of the central control unit, which will change the master unit address in the appropriate section of memory portion 19.

In an alternative system, the master unit of the zone from which calls are to be transferred may give the divert signal to the central control unit, specifying which other master unit should receive the transferred calls. As an alternative to specific re-routing, the arrangement may be such that re-routing takes place in the event of a call remaining unanswered on any particular master unit for a specified duration, the microprocessor being programmed to change the address in memory portion 19 after that specified duration.

Furthermore, since there will sometimes be need for the wardens to communicate with one another, in addition to its normal emergency call handling function, each master unit may be used to raise a call to another master unit, by entering the distinguishing code of the master unit being called. This is, of course, only possible if both master units are connected to the system, either by being plugged into a speech module or in some other manner.

It is common practice for a group call system to be equipped with interface apparatus IF, enabling emergency calls raised on the system to be directed off-site, rather than being answered by a warden present on the site. Transmission of the emergency calls is by way of a line L1 of the public telephone network PTN, and may be to a central emergency control centre, for example serving all of the group call systems of a particular Local Authority, or may be to a staffed point at a further group call system. Such transfer occurs in response to a setting from the call system that will become unmanned, whereupon the central control unit of that system will link the system to the public telephone network.

Figure 3:
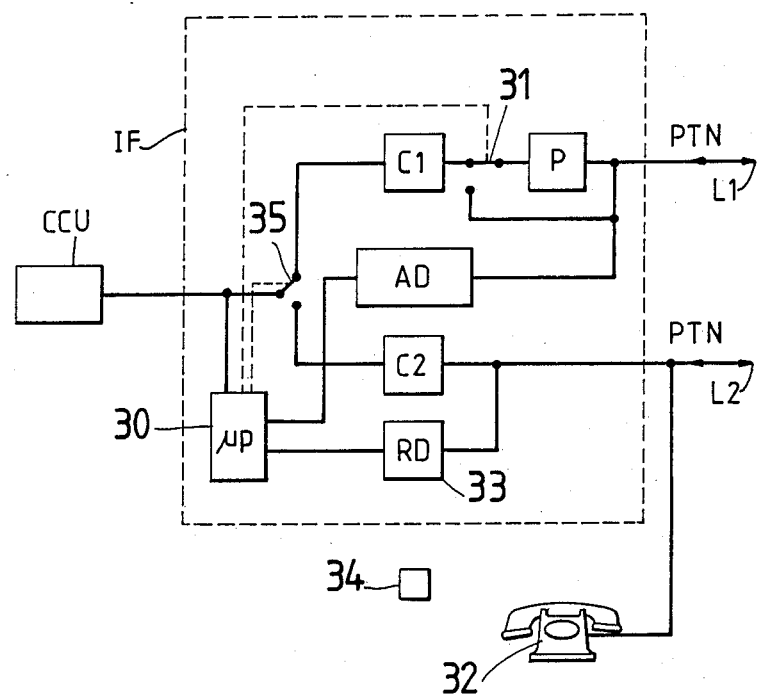
FIG. 3 is a schematic illustration of an interface unit embodied in the system.

FIG. 3 shows an interface unit capable of operating in this manner, including an autodialler AD, and the usual connecting apparatus C1 for connecting calls to the telephone network once a line has been established, and for disconnecting the call when communication has been completed. Such emergency calls are always transmitted with recognition protocol as the initial part of the call, adn P indicates means for adding this protocol to an outgoing call, and for recognising protocol on an incoming call. Without transmission and receipt of appropriate protocol emergency calls cannot be connected between the call system and the off-site location. Although indicated separately for convenience in FIG. 3, the unit P will in practice comprise part of a control microprocessor 30 incorporated in the interface unit, or of the microprocessor 16 of the central control unit.

It may happen that a warden finds a situation wherein an immediate call for outside emergency assistance is necessary, and where that assistance could not be properly summoned from the emergency control centre by going through the normal emergency call routine over the public telephone network. The system offers this facility in response to an appropriate code enetered in to the master unit and recognised as such by the central control unit. Two codes may be available, one indicating that an emergency call should be placed to a pre-programmed number, and the second indicating that an emergency call should be placed to a number to be entered by the warden on the master unit.

On receipt of the first code, the central control unit controls the microprocessor 30 of the interface to cause the autodialler to dial the pre-programmed number (stored in the memory of microprocessor 30) over the public telephone network line L1. The microprocessor will also cause switch 31 to be changed over so that the call bypasses the recognition protocol unit P. Again, although a physical switch has been illustrated, this function is readily carried out by suitable programming of the microprocessor 30. Once the call has been dialled and the telephone answered at the called number then connection is effected by way of the apparatus C1 and the warden can communicate directly from his master unit with the number called, without any interruption from recognition protocol. The call will probably be under control of the warden in the usual half-duplex mode controlled by the master unit MU. Once the call has been completed, the warden will enter a clear call code into the master unit, which will be recognised by the system as a command to disconnect by way of apparatus C1. Switch 31 then returns to its normal position for sending and receiving emergency calls.

If the emergency code entered by the warden indicates that the call is to be routed to a number to be entered from the master unit then that number is entered following the code, and is stored by the microprocessor 30 and displayed on the LCD 12 of the master unit. After the full code has been entered, a dial command is initiated from the master unit, and the microprocessor then controls the autodialler to effect dialling of the entered number. Communication then occurs in the manner already described.

The warden of a group call system usually has a conventional telephone 32 located at the base or office for the system and connected to the public telephone network over a further line L2 that is independent of line L1 used for communication with the emergency control centre or with another call system. When a warden is away from base it may be desirable that the warden is made aware of an incoming call on telephone 32, and also be given the facility of answering that call from the master unit. Accordingly, the interface incorporates a ring detector 33 connected to line L2, that can be activated by a switch 34 before the warden leaves the base. When the detector 33 detects an incoming call on line 2 a signal is directed to the microprocessor 30. The microprocessor of the interface and/or of the central control unit then directs a code to the master unit which will give an appropriate indication in the LCD display 12 to show that an incoming call is to be answered. The warden may either proceed to the office to answer the call or may accept the call on the master unit by entering a call accept code. When such an accept code is entered, a switch 35 changes to connect the central control unit to line L2 rather than line L1, and connecting apparatus C2 effects the speech connection over the line L2. The warden is then able to communicate over that line, usually in the normal half-duplex mode under control of the master unit. When the call has been completed, a clear code is entered on the master unit which causes apparatus C2 to break the connection and causes microprocessor 30 to restore switch 35 to the normal position connected to line L1.

It will be understood that the interface unit of FIG. 3 may be used in the zoned system described with reference to FIG. 1 wherein a plurality of master units are provided, may be used in a non-zoned system having a plurality of master units, or may be used in a system having only one master unit. When there is only one master unit then obviously all incoming calls to telephone 32 are directed to that master unit.

In a non-zoned system twith a plurality of master units there may be an additional public network telephone line for each master unit, with all incoming calls on a given line being diverted to the master unit associated therewith. A zoned system may be programmed so that all incoming calls at telephone 32 are directed to one master unit only. Alternatively the fact that an incoming call is present may be displayed on all master units connected to the system, and the first warden to accept the call on his or her master unit then attends to the call as necessary and clears it from the system. Once the call has been answered on one master unit the incoming call indication is inhibited on all other master units. Each master unit may be operated to direct a code to the central control unit to identify itself as being available or unavailable to receive an incoming call. In a further alternative the system may include means whereby any particular master unit may at any time be selected as the unit to receive incoming calls. In this case, the distinguishing code of the selected master unit will be stored in microprocessor 30 to ensure that the calls are directed to that unit only.

It will be understood that modifications are possible to the specific system disclosed, and also that the system functions may be controlled by many different programmes for the microprocessors. The specific programmes to be used can readily be written by those skilled in the art, on the basis of the disclosure herein.

We claim:

1. A speech emergency call system comprising a central control unit; a system cable connected to the central control unit; a plurality of speech modules each capable of handling two-way speech communication, all the speech modules being connected in parallel to the central control unit by the system cable; each speech module having an associated call initiator and means for transmitting a unique identity code from that speech module to the central control unit when a call is initiated from that speech module; a master unit comprising means whereby it is connectable to the system cable, alerting means capable of response to a call initiated from a speech module and two-way speech communication control means; an interface unit connected between the central control unit and a line of the public telephone network, the interface unit including autodialling means for automatically dialling telephone number; the master unit and the central control unit including emergency call means operative to cause an outgoing call to be autodialled over the public telephone network and for the master unit to be placed in two-way speech communication once the outgoing call has been connected.

2. A system according to claim 1 in which the autodialling means operates to dial a pre-programmed telephone number.

3. A system according to claim 1 in which the autodialling means operates to dial a non-pre-programmed telephone number selected by appropriate operation of the master unit.

4. A system according to claim 1 in which the means whereby the master unit is connectable to the system cable comprises connection means whereby said master unit may be connected to any selected one of the speech modules, and the speech communication control means on each master unit comprises means for controlling two-way speech communication through the selected speech module to which the master unit is connected.

5. A system according to claim 1 in which the central control unit includes means responsive to an incoming call from the public telephone network, and for signalling to the master unit that such incoming call is present.

6. A system according to claim 5 in which the central control unit includes means for routing the incoming call to the master unit, and the master unit has means enabling it to receive the incoming call.

7. A system according to the claim 1 in which a plurality of master units are provided, and each master unit has the capability of causing an outgoing call to be autodialled over the public telephone network.

8. A system according to claim 5 in which a plurality of master units are provided, each master unit has a unique distinguishing code, and the central control unit is operative to route an incoming call to any selected master unit.

9. A system according to claim 8 in which each master unit includes means whereby it may identify itself to the central control unit as being available or unavailable to receive an incoming call.

10. A speech emergency call system comprising a central control unit; a system cable connected to the central control unit; a plurality of speech modules each capable of handling two-way speech communication, all the speech modules being connected in parallel to the central control unit by the system cable; each speech module having an associated call initiator and means for transmitting a unique identity code from that speech module to the central control unit when a call is initiated from that speech module; a plurality of master units, each having a unique distinguishing code, each master unit comprising means whereby it is connectable to the system cable, alerting means capable of response to a call initiated from a speech module and two-way speech communication control means; the control unit including recognition means for recognising the identity code of any calling speech module, and routing means for initially routing all calls from a first group of speech modules as recognized by said recognition means to a first one of said master units, and for intially routing all calls from a second group of speech modules as recognized by said recognition means to a second one of said master units; an interface unit connected between the central control unit and a line of the public telephone network, the interface unit including autodial means for automatically dialling a telephone number; each master unit and the central control unit including emergency call means operative to cause an outgoing call to be autodialled over the public telephone network and for the master unit to be placed in two-way speech communication once the outgoing call has been connected; and the central control unit including means responsive to an incoming call from the public telephone network and for routing that call to any selected master unit, each master unit having means enabling it to receive an incoming call.

* * * * *